United States Patent [19]

Asada

[11] 4,346,739
[45] Aug. 31, 1982

[54] COMPOSITE METAL TUBING

[75] Inventor: Kikuo Asada, Mishima, Japan

[73] Assignee: Usui Kokusai Sangyo Kabushiki Kaisha, Shizuoka, Japan

[21] Appl. No.: 199,290

[22] Filed: Oct. 21, 1980

[30] Foreign Application Priority Data

Oct. 24, 1979 [JP] Japan .................................. 54-137407

[51] Int. Cl.³ .............................................. F16L 9/14
[52] U.S. Cl. .................................... 138/143; 138/177; 29/523
[58] Field of Search ............... 138/137, 140, 141, 145, 138/177, 143; 29/523

[56] References Cited

U.S. PATENT DOCUMENTS

| | | | |
|---|---|---|---|
| 1,306,690 | 6/1919 | Gillespie | 138/143 X |
| 3,769,691 | 11/1973 | Puzik | 138/140 X |
| 4,028,785 | 6/1977 | Jackson et al. | 138/143 X |
| 4,261,769 | 4/1981 | Usui | 138/177 X |

*Primary Examiner*—James E. Bryant, III
*Attorney, Agent, or Firm*—Hedman, Casella, Gibson & Costigan

[57] ABSTRACT

A composite metal tubing is provided which includes an inner tubular member press fitted into the bore of an outer tubular member. The inner tubular member is made of a steel having a tensile strength of at least 48 kg/mm². Additionally, the wall of the inner tubular member has a thickness equal to 1.5 to 8.5% of the outer diameter of the outer tubular member. The resultant composite tubing has increased pressure resistance and resists cavitation.

3 Claims, 3 Drawing Figures

COMPOSITE METAL TUBING

The present invention relates to composite metal tubing and, in particular, such tubing suitable for use as a high pressure fuel injection pipe for a diesel engine and more particularly to a thick and slender metal tubing having an external diameter of about 30 mm at most and having its outer and inner tubular members press-fitted on each other.

The inner circumference of most conventional high pressure fuel injection pipes is specially treated for example, as disclosed in SAE Standard, Fuel Injection Tubing-SAE J 529b. Consequently conventional fuel injection pipes are expensive and it has recently been proposed to use composite tubing (the so-called "fitted" pipe) which is constructed by press-fitting a special steel pipe within an outer pipe.

Fitted metal pipes of this kind have been made either by press-fitting carbon steel pipes (STP 35) for high pressure piping, which are plated in advance with copper films on the mating surfaces and subsequently heating the copper films to form a brazed joint or by simply press-fitting without the need to consider the tensile strength and thickness inherent in an inner tubular member.

As a result of the high internal flow pressures now required for the new generation of more powerful high speed engines, radial cavitation occurs in the bore of the fuel injection pipe. There is a tendency for this to loosen the press-fit between the finished tubular members even after they were subjected to the correcting treatment that is the final step so that the pressure resistance or breaking strength deteriorates with the attendant risk of cracking or breakage exacerbated by engine vibrations.

One object of the present invention is to mitigate the problems described above and to provide thick walled composite tubing which, for a given external diameter and wall thickness and without the need for any complex treatment such as hardening of the surface of the bore, has improved pressure resistance (or breaking strength) to an internal flow pressure and reduced tendancy to cavitation in the bore as compared with conventional fuel injection pipes.

According to this invention, we propose thick walled composite metal tubing comprising a thick walled outer tubular member and an inner tubular member press-fitted in the bore of the outer tubular member wherein the inner tubular member is made of steel having a tensile strength at least equal to 48 Kg/mm$^2$ and has a wall thickness of 1.5 to 8.5% of the external diameter of the composite tubing. By using a special steel pipe as the inner tubular member, the need for brazing after press-fitting is obviated so that after subjected to the correcting treatment that is the final step the fitting can be improved in such that there is no tendancy to loosen the press fit between the finished tubular members.

A preferred embodiment of the invention will now be described by way of example with reference to the accompanying drawings of which:

Figure 1:
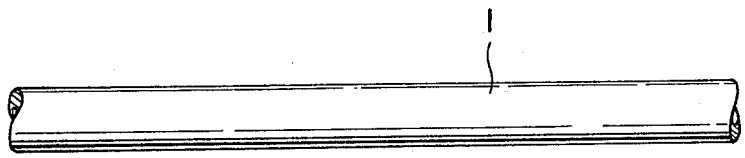
FIG. 1 is a plan view showing a thick walled composite fuel injection pipe.
Figure 2:
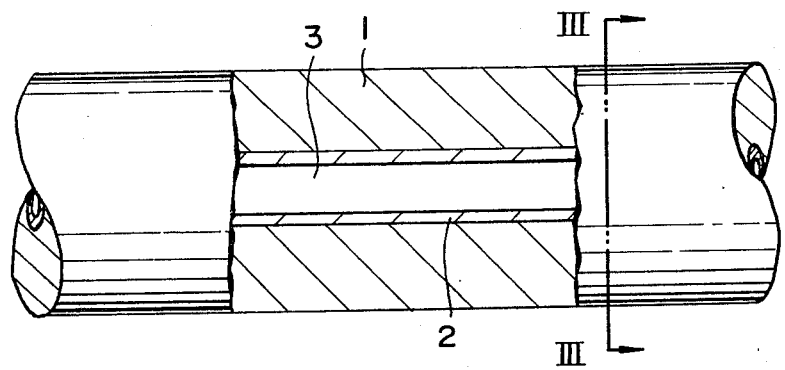
FIG. 2 is an enlarged sectional view of FIG. 1 with its portion being cut away.
Figure 3:
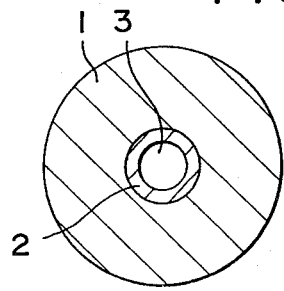
FIG. 3 is a section taken along line III—III of FIG. 2.

The fuel injection pipe shown is formed by press-fitting an inner tubular member 2 in an outer thick-walled tubular member 1 of carbon steel such as used in high pressure applications and having an external diameter equal to or less than about 30 mm. The inner tubular member 2 has a bore 3 for the flow of high pressure fuel, and is made of stainless steel, chromium-molybdenum or manganese and has a tensile strength equal to or higher than 48 Kg/mm$^2$ and a wall thickness of 1.5 to 8.5% of the external diameter of the composite tube formed by the outer tubular member 1 and the inner tubular member 2.

Because the inner tubular member is press-fitted under the condition holding the tensile strength of at least 48 Kg/mm$^2$ and has a wall thickness within the range of 1.5 to 8.5% of the external diameter of the composite tube, the pressure resistance or breaking strength of the tubing can be improved by virtue of the aforementioned tensile strength, and cavitation in surface of the bore 3 when subject to internal flow pressure is prevented or at least much reduced. The aforementioned thickness range is selected on the following ground. That is, when the thickness of the press-fitted inner tubular member is more than 1.5% with respect to the external diameter of the finished tubular member after subjected to the correcting treatment that is the final step, the corrugated irregular deformation which has been established at the communication passage 3 according to the prior art can be prevented, while the above-mentioned thickness is less than 8.5%, there is no loosening of the press-fit.

I claim:

1. A thick walled composite metal high pressure fuel injection tubing comprising:

a thick walled outer tubular member having inner and outer diameters defining concentric inner and outer cylindrical surfaces, the outer diameter of said outer tubular member being not greater than 30 mm; and an inner tubular member having inner and outer diameters defining inner and outer cylindrical surfaces, the outer diameter of the inner tubular member being substantially equal to the inner diameter of the outer tubular member, the inner tubular member being press-fitted into the outer tubular member such that the inner tubular member outer surface abuts the outer tubular member inner surface, the inner tubular member being made of steel having a tensile strength at least equal to 48 Kg/mm$^2$, the radial distance between the inner tubular member inner and outer cylindrical surfaces being equal to 1.5 to 8.5% of the outer diameter of the outer tubular member.

2. Tubing according to claim 1 wherein the outer tubular member is made of carbon steel.

3. Tubing according to claim 1 or claim 2, wherein the inner tubular member is made of stainless, chromium-molybdenum or manganese steel.

* * * * *